United States Patent
Chan et al.

(10) Patent No.: US 12,386,883 B2
(45) Date of Patent: Aug. 12, 2025

(54) FINE-GRAINED VISUAL CONTENT SEARCH PLATFORM

(71) Applicant: Hong Kong Applied Science and Technology Research Institute Company Limited, Hong Kong (HK)

(72) Inventors: Chun Ming Chan, Hong Kong (HK); Zheng Long Li, Hong Kong (HK); Yi Ping Tse, Hong Kong (HK); Sung Ho Cheung, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 325 days.

(21) Appl. No.: 18/172,356

(22) Filed: Feb. 22, 2023

(65) Prior Publication Data
US 2023/0325434 A1    Oct. 12, 2023

Related U.S. Application Data

(60) Provisional application No. 63/330,311, filed on Apr. 12, 2022.

(51) Int. Cl.
*G06F 16/532* (2019.01)
*G06F 16/538* (2019.01)
(Continued)

(52) U.S. Cl.
CPC .......... *G06F 16/532* (2019.01); *G06F 16/538* (2019.01); *G06F 16/55* (2019.01); *G06N 3/045* (2023.01); *G06N 3/0464* (2023.01)

(58) Field of Classification Search
CPC ...... G06F 16/532; G06F 16/55; G06F 16/538; G06N 3/045; G06N 3/0464
See application file for complete search history.

(56) References Cited

U.S. PATENT DOCUMENTS

| 5,893,095 A | 4/1999 | Jain et al. |
| 7,499,916 B2 | 3/2009 | Liu et al. |

(Continued)

FOREIGN PATENT DOCUMENTS

| CN | 104281588 A | 1/2015 |
| CN | 107291855 A | 10/2017 |

(Continued)

OTHER PUBLICATIONS

International Search Report and Written Opinion of corresponding PCT application No. PCT/CN2023/082313 mailed on May 19, 2023.

(Continued)

*Primary Examiner* — Kannan Shanmugasundaram
(74) *Attorney, Agent, or Firm* — Idea Intellectual Limited; Sam T. Yip (57) ABSTRACT

A visual content search and retrieval platform comprising an object detection model, a coarse-grained image classification model, and a selection of fine-grained image classification models. During inference, the object detection model locates and extracts a query object in a query image; the coarse-grained image classification model classifies the query object's meta-category; the fine-grained image classification model trained and optimized for the meta-category of the query object is selected; and the selected fine-grained image classification model searches and retrieves from an image database images of objects most similar to the query object. The fine-grained image classification model is implemented by a multi-focus fine-grained image search and retrieval apparatus comprising a class learning module learned to generate the query object's overall appearance query features; a local description module learned to generate the query object's local details query features; an (Continued)

outline description module learned to generate the query object's outline query features.

8 Claims, 6 Drawing Sheets

(51) Int. Cl.
*G06F 16/55* (2019.01)
*G06N 3/045* (2023.01)
*G06N 3/0464* (2023.01)

(56) References Cited

U.S. PATENT DOCUMENTS

| | | | |
|---|---|---|---|
| 8,879,855 | B2 | 11/2014 | Angelova et al. |
| 9,390,315 | B1 * | 7/2016 | Yalniz ................. G06T 7/90 |
| 9,665,802 | B2 | 5/2017 | Wang et al. |
| 2013/0290222 | A1 | 10/2013 | Gordo et al. |
| 2015/0294191 | A1 * | 10/2015 | Zhang ................ G06T 7/0002 |
| | | | 382/160 |
| 2016/0140424 | A1 | 5/2016 | Wang et al. |
| 2016/0162758 | A1 | 6/2016 | Prest |
| 2017/0083792 | A1 | 3/2017 | Rodriguez-Serrano et al. |
| 2017/0287170 | A1 | 10/2017 | Perona et al. |
| 2020/0019628 | A1 | 1/2020 | Chen et al. |
| 2020/0242153 | A1 * | 7/2020 | Luo ..................... G06V 10/764 |
| 2020/0272813 | A1 * | 8/2020 | Hebbalaguppe ..... G06V 10/764 |

FOREIGN PATENT DOCUMENTS

| | | | |
|---|---|---|---|
| CN | 112612913 A | * | 4/2021 |
| CN | 112633276 A | | 4/2021 |

OTHER PUBLICATIONS

Yue Chen et al., "Destruction and Construction Learning for Fine-grained Image Recognition", 2019 IEEE/CVF Conference on Computer Vision and Pattern Recognition (CVPR), Institute of Electrical and Electronics Engineers, 2019, pp. 5152-5161.

Yifan Sun et al., "Circle Loss: A Unified Perspective of Pair Similarity Optimization", 2020 IEEE/CVF Conference on Computer Vision and Pattern Recognition (CVPR), Institute of Electrical and Electronics Engineers, 2020, pp. 6397-6406.

Jonathan Krause et al., "3D Object Representations for Fine-Grained Categorization", 2013 IEEE International Conference on Computer Vision Workshops, Institute of Electrical and Electronics Engineers, 2013, pp. 554-561.

Wonsik Kim et al., "Attention-based Ensemble for Deep Metric Learning", Proceedings of the European conference on computer vision (ECCV), 2018.

Xianxian Zeng et al., "Fine-Grained Image Retrieval via Piecewise Cross Entropy Loss", Image and Vision Computing, 2020, vol. 93.

Pierre Jacob et al., "Metric Learning With HORDE: High-Order Regularizer for Deep Embeddings", 2019 IEEE/CVF International Conference on Computer Vision (ICCV), Institute of Electrical and Electronics Engineers, 2019, pp. 6538-6547.

Eu Wern Teh et al., "ProxyNCA++: Revisiting and Revitalizing Proxy Neighborhood Component Analysis", Proceedings of the European conference on computer vision (ECCV), Springer Cham, 2020.

Aleksandr Ermolov et al., "Hyperbolic Vision Transformers: Combining Improvements in Metric Learning", Proceedings of the IEEE/CVF Conference on Computer Vision and Pattern Recognition, Institute of Electrical and Electronics Engineers, 2022, pp. 7409-7419.

* cited by examiner

FINE-GRAINED VISUAL CONTENT SEARCH PLATFORM

CROSS-REFERENCES WITH RELATED APPLICATIONS

The present application claims priority to U.S. Provisional Patent Application No. 63/330,311 filed Apr. 12, 2022; the disclosure of which is incorporated herein by reference in its entirety.

TECHNICAL FIELD

The present invention relates to machine learning techniques in image object recognition, and image search and retrieval.

BACKGROUND

Machine deep learning techniques have been widely applied in vision-related applications. In image classification or recognition studies, most of the investigations have been focusing on the meta-category classification (i.e., coarse-grained image classification). For example, classification of meta-categories comprising dogs, cats, flowers, etc. Less researches have been conducted on the sub-category classification (i.e., fine-grained image classification) that recognizes specific species of the same meta-category. For example, classification of canine-species sub-categories of the dog meta-category comprising Labrador, Golden Retriever, Puddle, etc.; or in another example, the sub-categories of brands and models of the automobile meta-category. Potential artificial intelligence (AI) applications of fine-grained image classification are vast, such as fashion clothing matching, wild animal identification, medical diagnosis, vehicle brand and model identification, etc.

However, fine-grained image analysis is currently a critical challenge. It entails training a classification model to classify visually similar species by analyzing the local details of objects (i.e., local parts, shape, texture, color, etc.). Some existing fine-grained image classification methods employ manual annotation or labelling of local differences among species in the training data during the model training. These manual processes are required for each meta-category. This is labour intensive, costly, and difficult to achieve large scale scenario application.

Therefore, there is an unmet need in the art for a fine-grained image classification method that can automatically locate and analyse features of local differences among species and be able to handle larger scale application with many different scenarios.

SUMMARY OF INVENTION

In addressing the aforementioned unmet needs, the present invention provides a fine-grained image classification method that automatically locates and analyses local differences among species. In addition, in order to further improve the retrieval efficiency of the model in scenarios with a large number of meta-categories and sub-categories, the present invention provides a intelligent visual content search platform having a hierarchical architecture design. Moreover, it also supports custom models to be re-trained on a benchmark model to achieve higher quality prediction results. As such, embodiments of the present invention can significantly reduce the amount of manual data labelling, in turn provide the possibilities for large-scale applications.

It is an objective of the present invention to provide a visual content search and retrieval platform to address the aforementioned shortcomings and unmet needs in the state of the art. In accordance with a first aspect of the present invention, a method for performing visual content search and retrieval from an image database using a visual content search and retrieval platform is provided. The visual content search and retrieval platform has a hierarchical architecture and comprises an object detection model, a coarse-grained image classification model, and a selection of one or more fine-grained image classification models.

During inference, the method comprises: receiving from an electronic device (i.e., an IP camera, mobile communication device, electronic kiosk, personal computer, etc.) a query image containing one or more objects; locating and extracting a query object among the objects in the query image by the object detection model; classifying a meta-category of the query object by the coarse-grained image classification model; selecting from the selection of fine-grained image classification models the one fine-grained image classification model that is trained and optimized for the meta-category of the query object; and searching and retrieving from the image database gallery images containing gallery image objects belonging to the meta-category of the query object by the selected fine-grained image classification model.

In accordance with a second aspect of the present invention, the visual content search and retrieval platform further comprises a semi-automatic labelling module. The semi-automatic labelling module comprises an unsupervised or semi-supervised prediction model trained to estimate locations of sample objects in training data images by detecting edges, texture changes, color deviations, etc. and place bounding boxes around the estimated locations. During training, training data of images containing sample objects are processed by the semi-automatic labelling module for generating and displaying semi-labelled images for a user to fine-tune the bounding boxes for more accurately labelling the sample objects therewithin. This way, the fully annotated training data is produced without the need for manual labelling from scratch, significantly enhancing training data labelling efficiency.

In accordance with a third aspect of the present invention, each of the fine-grained image classification models is implemented by an apparatus for multi-focus fine-grained (MFFG) image search and retrieval 200. The apparatus for MFFG image search and retrieval 200 comprises: a feature extraction network configured to extract one or more basic query features of a query object from a query image; a class learning module (CLM) configured to generate one or more first specific query features from the basic features, wherein the first query specific features represent an overall appearance of the query object; a local description module (LDM) configured to generate one or more second specific query features from the basic features, wherein the second query specific features represent local details of the query object; an outline description module (ODM) configured to generate one or more third specific query features from the basic query features, wherein the third specific query features represent an outline of the query object; and an image search engine configured to combine the first, second, and third specific query features to form one or more image-query joint features for comparing and matching the query object with a plurality of gallery image objects.

Each of the CLM, LDM, and ODM comprises its specific pairwise-sample-based loss function. During training, training data of original images are augmented with Region Confusion Mechanism (RCM). Each of the respective pairwise-sample-based loss functions of the CLM, LDM, and ODM minimizes the feature distance of positive sample pairs and maximizes the feature distance of negative sample pairs by learning the specific features of original images and RCM images.

BRIEF DESCRIPTION OF DRAWINGS

Embodiments of the invention are described in more details hereinafter with reference to the drawings, in which.

DETAILED DESCRIPTION OF THE INVENTION

In the following description, apparatuses and methods of machine learning (ML)-based image search and retrieval and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
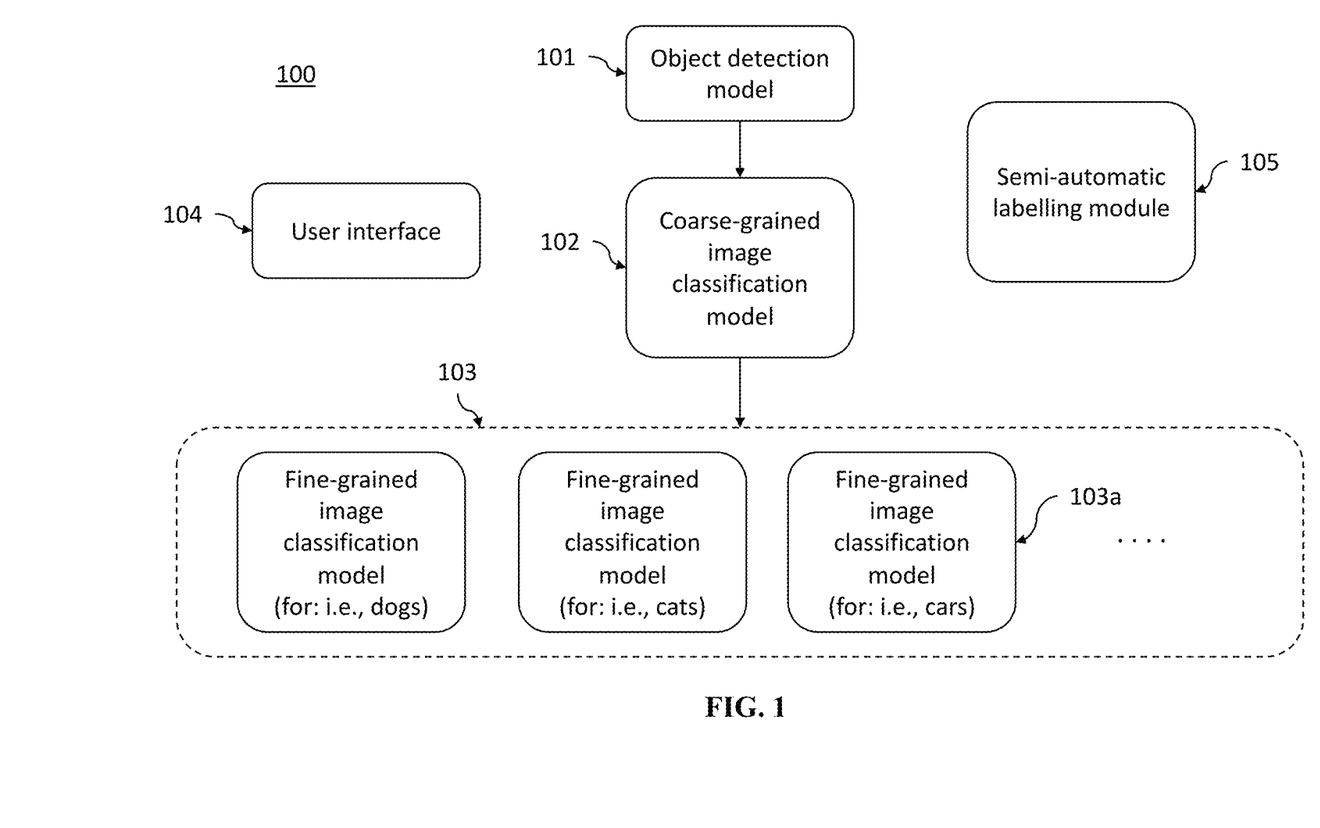
FIG. 1 depicts a schematic diagram of a visual content search and retrieval platform in accordance with a first aspect of the present invention.

Referring to FIG. 1 for the following description. In accordance with a first aspect of the present invention, a method for performing visual content search and retrieval from an image database 110 using a visual content search and retrieval platform is provided. In accordance to one embodiment, the visual content search and retrieval platform 100 has a hierarchical architecture and comprises an object detection model 101, a coarse-grained image classification model 102, and a selection of one or more fine-grained image classification models 103.

During inference, the method comprises: receiving from an electronic device (i.e., an IP camera, mobile communication device, electronic kiosk, personal computer, etc.) a query image containing one or more objects; locating and extract a query object among the objects in the query image by the object detection model 101; classifying a meta-category of the query object by the coarse-grained image classification model 102; selecting from the selection of fine-grained image classification models 103 the fine-grained image classification model 103a that is trained using training data comprising images containing sample objects belonging to the meta-category of the query object; and searching and retrieving from the image database 110 a plurality of gallery images containing gallery image objects belonging to the meta-category of the query object by the selected fine-grained image classification model 103a.

In accordance to one embodiment, the object detection model 101 is lightweight and convolution-based. It applies a real-time supervised-based object detection approach to extract objects from images from background noise. The object detection model 101 is trained to predict the locations or bounding boxes of all possible objects in a query image by learning the features from training data comprising annotated images. Thus, the object detection model 101 is capable of detecting multiple objects contained in a single query image, and capable of locating and extracting query objects of different scales against the query image.

In accordance to one embodiment, the coarse-grained image classification model 102 is implemented by a pre-trained convolutional neural network (CNN) comprising one or more convolutional layers, and a decision module having one or more fully-connected layers. The CNN may be based on, for example, without limitation, the VGG19, Resnet50, or BN-Inception neural network. During inference, the convolutional layers extract one or more basic features of a query object located and extracted by the object detection model 101. The basic features are then input into the decision module to be summarized and made meta-category classification of the query object.

In accordance with one embodiment, the visual content search and retrieval platform 100 further comprises a user interface 104. The user interface 104 provides the facilities to electronically display graphical and textual information to a user of the visual content search and retrieval platform 100 and to allow the user to enter user input data and commands. The functionalities of the user interface 104 include receiving of user input data and commands for preprocessing query images; receiving of user input data and commands for customization and management of the visual content search and retrieval platform 100 such as search and retrieval model deployments for different applications and connections to different gallery image data bases; receiving of user input data and commands in training the visual content search and retrieval platform 100 for a new search and retrieval model such as the obtainment and labelling of training dataset; receiving of user input data and commands and displaying results in evaluating the search and retrieval models of the visual content search and retrieval platform 100; and displaying search and retrieval results.

In accordance with a second aspect of the present invention, the visual content search and retrieval platform 100 further comprises a semi-automatic labelling module 105. The semi-automatic labelling module 105 comprises an unsupervised or semi-supervised prediction model trained to estimate locations of sample objects in images by detecting edges, texture changes, color deviations, etc. and place bounding boxes around the estimated locations. During training, training data of images containing sample objects are processed by the semi-automatic labelling module 105 for generating and displaying (via the user interface 104) semi-labelled images for the user to fine-tune the bounding boxes for more accurately labelling the sample objects therewithin. This way, the fully annotated training data is produced without the need for manual labelling from scratch, significantly enhancing training data labelling efficiency.

During training, the fully annotated training data is used in training the object detection model 101 until the model converges. The sample objects in the training data images extracted by the object detection model 101 are then used in training the coarse-grained image classification model 102 until the model converges. The training data images that contain objects of a selected meta-category are used in training one of the fine-grained image classification models 103 until the model converges, wherein the trained fine-grained image classification model is optimized for classification within the selected meta-category.

In accordance with one embodiment, each of the fine-grained image classification models 103 is implemented by an apparatus for multi-focus fine-grained (MFFG) image search and retrieval as described in the following.

Figure 2:
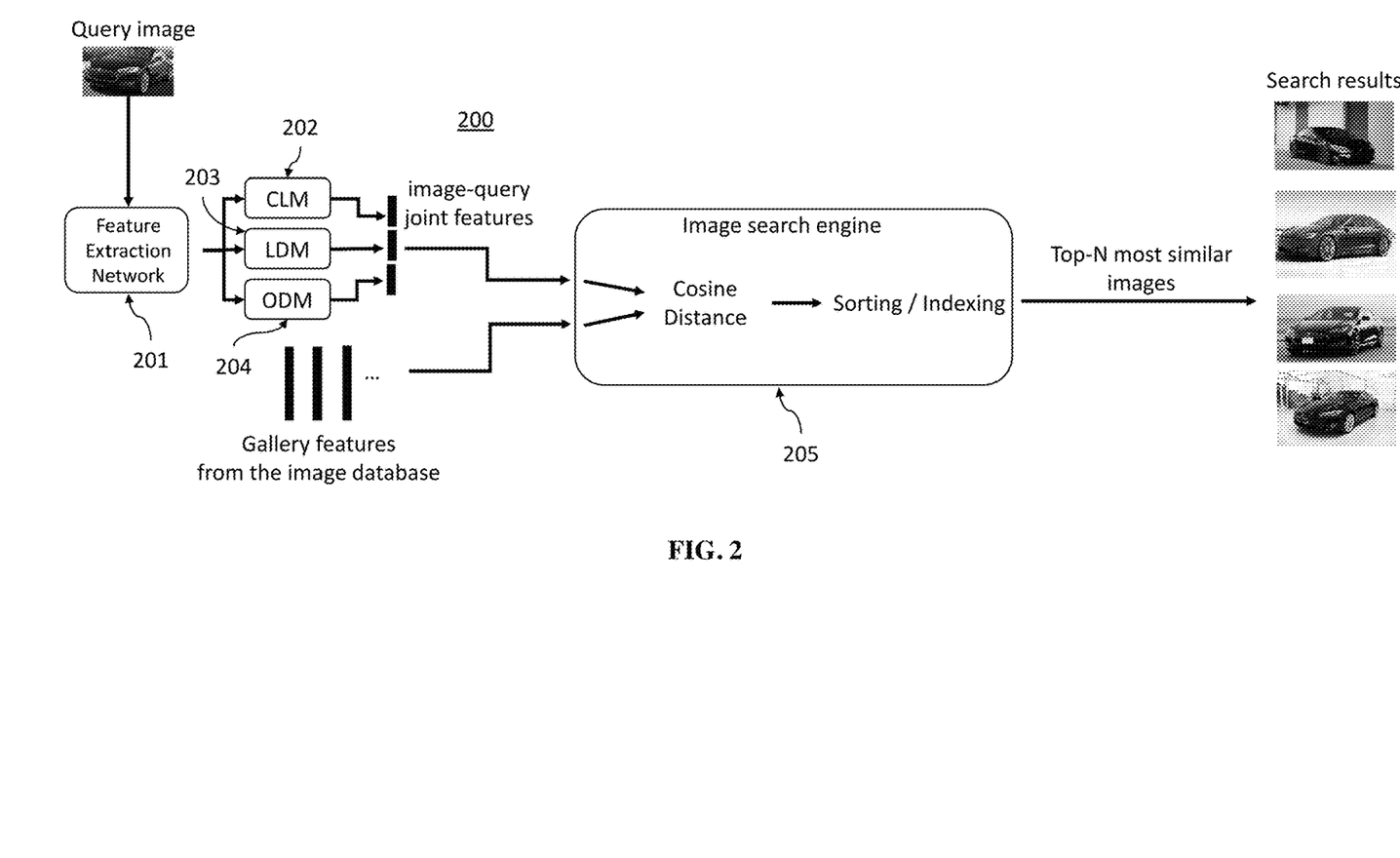
FIG. 2 depicts a schematic diagram of an apparatus for multi-focus fine-grained (MFFG) image search and retrieval in accordance with a second aspect of the present invention.

Referring to FIG. 2 for the following description. In accordance with a third aspect of the present invention, an apparatus for MFFG image search and retrieval 200 is provided. The apparatus for MFFG image search and retrieval 200 comprises: a feature extraction network 201 configured to extract one or more basic query features of a query object from a query image; a class learning module (CLM) 202 configured to generate one or more first specific query features from the basic features, wherein the first query specific features represent an overall appearance of the query object; a local description module (LDM) 203 configured to generate one or more second specific query features from the basic features, wherein the second query specific features represent local details of the query object; an outline description module (ODM) 204 configured to generate one or more third specific query features from the basic query features, wherein the third specific query features represent an outline of the query object; and an image search engine 205.

In one embodiment, the feature extraction network 201 is implemented by a pre-trained CNN comprising one or more convolutional layers and one or more fully-connected layers. Each of the CLM 202, LDM 203, and ODM 204 is implemented by a CNN comprising one or more convolutional layers and one or more fully-connected layers, and a pair-wise-sample-based loss function.

In a preferred embodiment, all of CLM 202, LDM 203, and ODM 204 are included and utilized in the apparatus for MFFG image search and retrieval 200. In one alternative embodiment, only CLM 202 and LDM 203 are included and utilized. In another alternative embodiment, only CLM 202 and ODM 204 are included and utilized. The implementation of any one of these alternative embodiments may be due to resource constraints.

The image search engine 205 is to combine the first, second, and third specific query features to form one or more image-query joint features. It then obtains from the image database 110 one or more features of each of a plurality of gallery image objects belonging to the same meta-category of the query object. To compare and match the query object with the gallery image objects, the image search engine 205 calculates a cosine distance between the image-query joint features and the features of each of the gallery image objects. The image search engine 205 then sorts the gallery image objects by the cosine distances from most similar to the query object to least similar to the query object. The gallery image object having the shortest cosine distance between the image-query joint features and the features of the gallery image object being the most similar to the query object, and the gallery image object having the longest cosine distance between the image-query joint features and the features of the gallery image object being the least similar to the query object. Finally, the image search engine 205 outputs top N number of gallery images of the sorted gallery image objects that are most similar to the query object.

In one preferred embodiment, the combining of the first, second, and third specific query features to form the image-query joint features is done by concatenation of the specific query features. In another embodiment, the combining of the first, second, and third specific query features to form the image-query joint features is done by summation of the specific query features. While the concatenation method of combining generates embeddings of larger size, hence possibly more resource intensive, than the summation method, the search and retrieval model of the apparatus for MFFG image search and retrieval 200 learned with the concatenation method produces better performance than that with the summation method.

Figure 3:
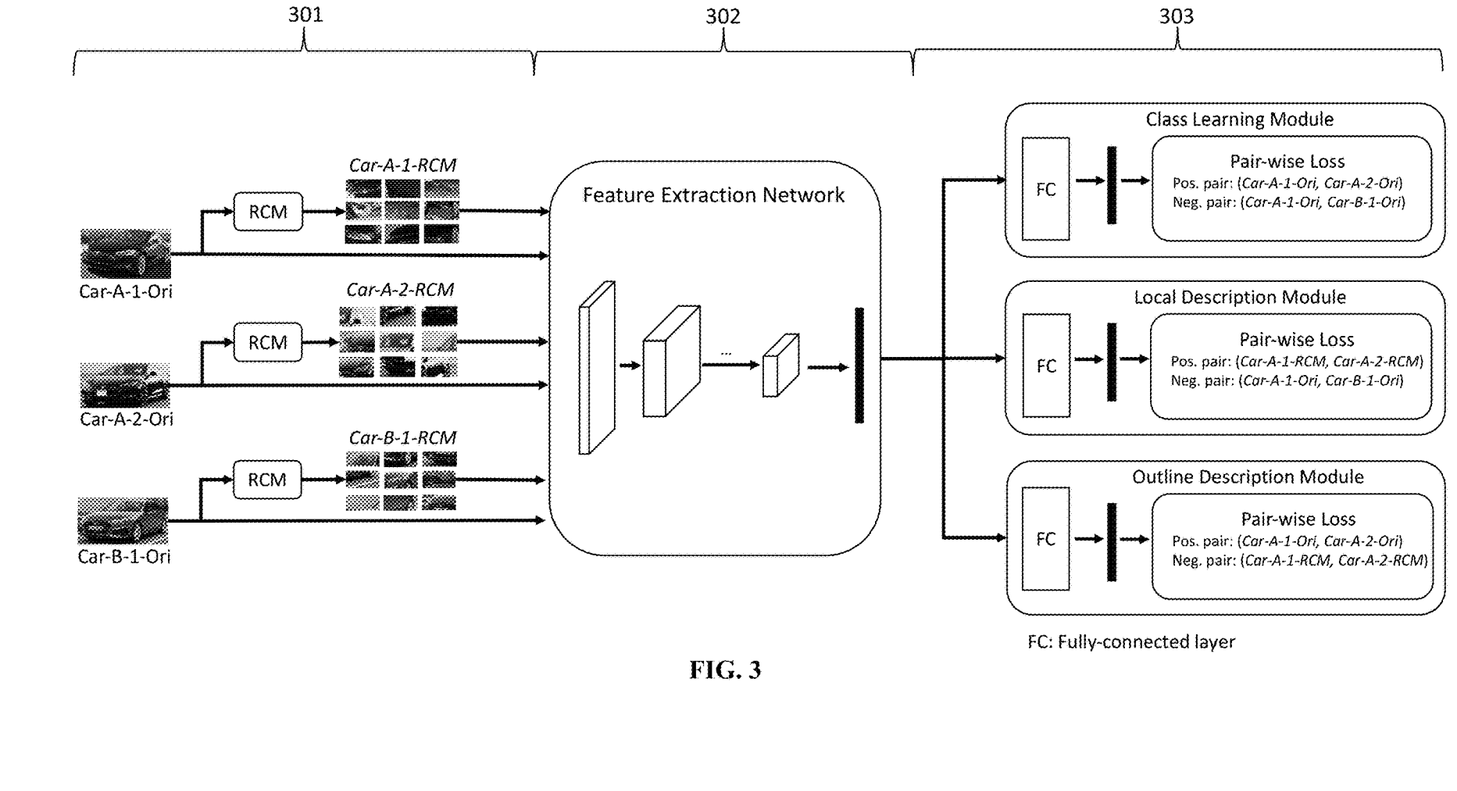
FIG. 3 depicts a schematic diagram of a method of training the apparatus for MFFG image search and retrieval in accordance with an embodiment of the present invention.

Referring to FIG. 3 for the following description. In accordance with one embodiment, the training of the apparatus for MFFG image search and retrieval 200 comprises first obtaining a training dataset (process 301) for a particular meta-category that the particular apparatus for MFFG image search and retrieval is to be optimized for. The training dataset comprises a plurality of original images each containing one of a plurality of sample objects belonging to one of a plurality of sub-categories belonging to that particular meta-category. Next, a Region Confusion Mechanism (RCM) image for each of the original images is generated by an augmentation module. The RCM image is generated by separating the corresponding original image into a plurality of blocks followed by randomly reshuffling positions of the blocks and one or more of augmentation operations such as vertical and horizontal flipping of the blocks, and cropping and resizing the contents of the block. By augmenting an original image with its corresponding RCM image, the contents of each of the blocks in the RCM image describe the local details of the sample object, which in turn can guide the search and retrieval model of the apparatus for MFFG image search and retrieval 200 to learn to pay more attentions to the important local parts of objects being classified.

To illustrate the above, images of cars are shown as example in FIG. 3. These images are referenced by captions under the formal of: [meta-category]-[sub-category]-[sample #]-[Org: original image/RCM: RCM image]. As such, the image with the caption Car-A-1-Ori means it is an original image of sample object no. 1 in the sub-category of A, which is in the Car meta-category; and the Car-B-1-RCM means it is an RCM image of sample object no. 1 in the sub-category of B, which is in the Car meta-category.

The training continues with inputting the training dataset to the apparatus for MFFG image search and retrieval 200 and having its feature extraction network 201 to extract one or more sample features of the sample object from each of the original images and each of the RCM images (process 302). Then, the CLM 202, LDM 203, and ODM 204 are iteratively trained with the sample features until their classification models converge (process 303).

In training the CLM 202, the target is to minimize a first pairwise-sample-based loss of the CLM 202. First, a first positive sample pair with an anchor original image as one of the original images containing a sample object belonging to one of the sub-categories and another one of the original images containing a sample object belonging to the same sub-category is constructed. Then, a first negative sample pair with the anchor original image and another one of the original images containing a sample object belonging to a sub-category different from the sub-category of the sample object in the anchor original image is constructed. The CLM's neural network parameters are tuned according to a pairwise-sample-based loss function, such that the average feature distance of all first positive sample pairs of the original images is minimized and the average feature distance of all first negative sample pairs of the original images is maximized, thereby minimizing the first pair-wise loss. More specifically, as the CLM pairwise-sample-based loss function minimizes the first pair-wise loss, the neural network of the CLM 202 is updated such that the first specific features of sample objects of the same sub-category generated by the CLM 202 can be clustered and the first specific features of sample objects of different sub-categories generated by the CLM 202 can be separated. The first specific features generated by the trained CLM 202 from an object are overall appearance features of objects and they should be similar for objects that belong to the same sub-category. On the other hand, the overall appearance features generated by the trained CLM 202 from objects belonging to different sub-categories should be distinguishing.

Figure 4A:
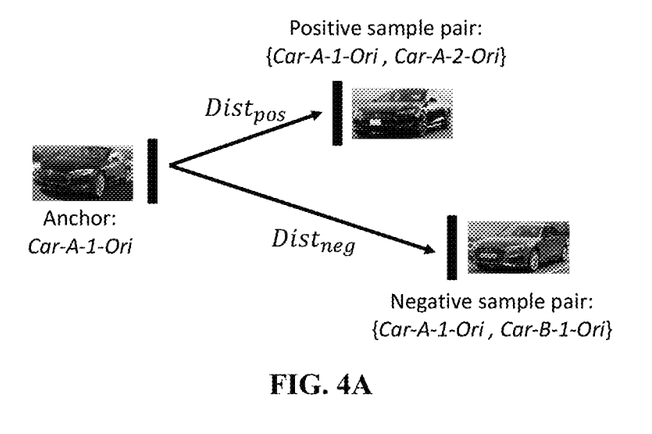
FIG. 4A depicts an illustration of a pairwise-sample-based loss function of a class learning module in accordance with an embodiment of the present invention.

To illustrate with an example, referring to FIG. 4A. In this example, a first positive sample pair is constructed with anchor original image Car-A-1-Ori and original image Car-A-2-Ori in the same sub-category A; and a first negative sample pair is constructed with anchor original image Car-A-1-Ori and original image Car-B-1-Ori in the sub-category B. The feature distance between the first positive sample pair is $Dist_{pos}$; and the feature distance between the first negative sample pair is $Dist_{neg}$.

The CLM 202 aims to discriminate descriptions between sub-categories from observing a sub-category under the overall appearances of objects.

In training the LDM 203, the target is to minimize a second pairwise-sample-based loss of the LDM 203. First, a second positive sample pair with an anchor RCM image as one of the RCM images containing a sample object belonging to one of the sub-categories and another one of the RCM images containing a sample object belonging to the same sub-category is constructed. Then, a second negative sample pair with an anchor original image as one of the original images that is corresponding to the anchor RCM image and another one of the original images containing a sample object belonging to a different sub-category as that in the anchor original image is constructed. The LDM's neural network parameters are tuned according to a pairwise-sample-based loss function, such that the average feature distance of all second positive sample pairs of the RCM images is minimized and the average feature distance of all second negative sample pairs of the original images is maximized, thereby minimizing the second pair-wise loss. As such, as the LDM pairwise-sample-based loss function minimizes the second pair-wise loss, the neural network of the LDM 203 is updated such that the second specific features of sample objects generated by the LDM 203 focus on describing the local details of the sample objects while still distinguishing sample objects of different sub-categories.

Figure 4B:
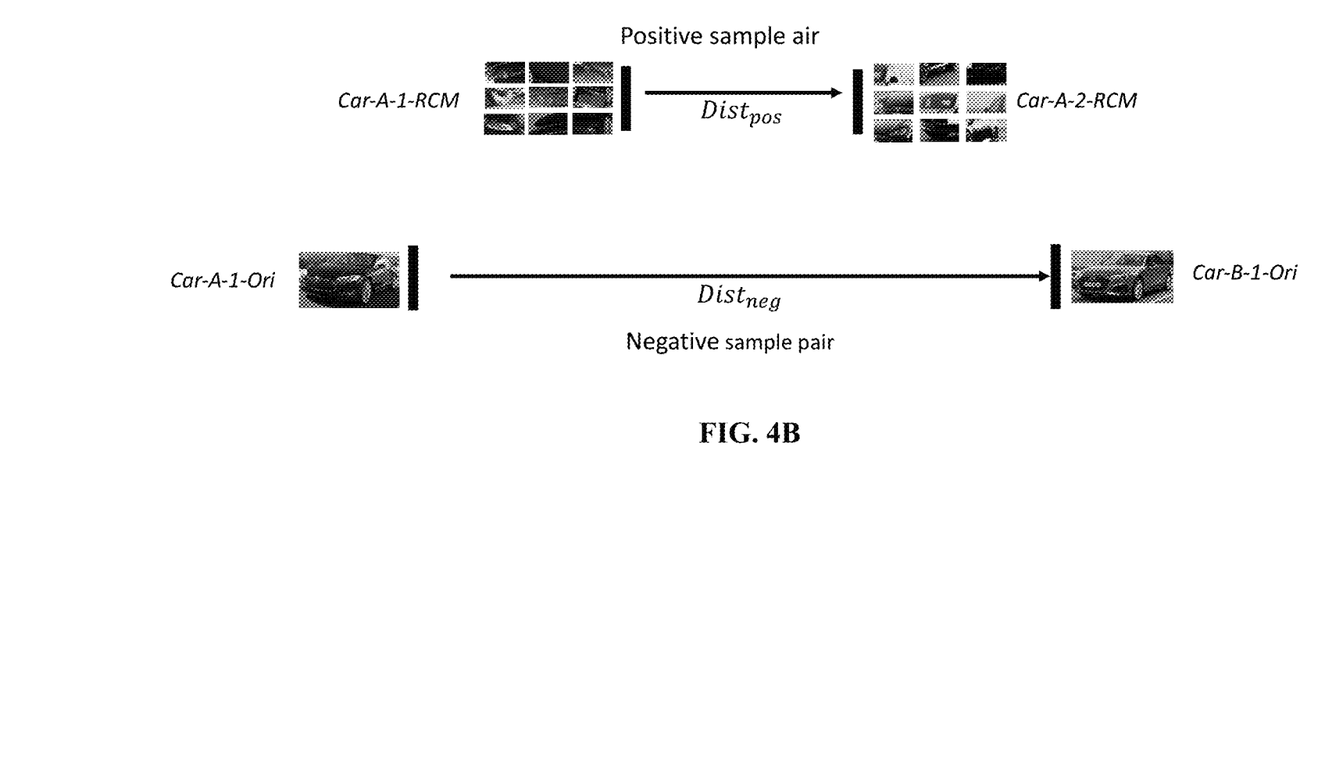
FIG. 4B depicts an illustration of a pairwise-sample-based loss function of a local description module in accordance with an embodiment of the present invention.

To illustrate with an example, referring to FIG. 4B. In this example, a second positive sample pair is constructed with RCM image Car-A-1-RCM and another RCM image Car-A-2-RCM in the same sub-category A; and a second negative sample pair is constructed with original image Car-A-1-Ori in the sub-category A and original image Car-B-1-Ori in the sub-category B. The feature distance between the second positive sample pair is $Dist_{pos}$; and the feature distance between the second negative sample pair is $Dist_{neg}$.

The LDM 203 aims to capture the common local part descriptions of objects in the same sub-category (i.e., logo, headlight, and door of the same car model). As the local details usually indicate differences between two visually similar sub-categories. The content of each block in an RCM image is what the module mainly concerns, and the connected features across regions in the RCM image are ignored. The second specific features generated by the LDM 203 are expected to show the local details of objects so that it can help the overall MFFG image search and retrieval apparatus in locating and extracting regions of interest from the objects for analyzing. The objects' unique local features of the same sub-category are clustered and found, while features existing in different sub-categories are ignored.

In training the ODM 204, the target is to minimize a third pairwise-sample-based loss of the ODM 204. First, a third positive sample pair with an anchor original image as one of the original images containing a sample object belonging to one of the sub-categories and another one of the original images containing a sample object belonging to the same sub-category is constructed. Then, a third negative sample pair with an anchor RCM image as one of the RCM images that is corresponding to the anchor original image and another one of the RCM images containing a sample object belonging to the same sub-category as that in the anchor RCM image is constructed. The ODM's neural network parameters are tuned according to a pairwise-sample-based loss function, such that the average feature distance of all third positive sample pairs of the original images is minimized and the average feature distance of all third negative sample pairs of the RCM images is maximized, thereby minimizing the third pair-wise loss. As such, as the ODM pairwise-sample-based loss function minimizes the third pair-wise loss, the neural network of the ODM 204 is updated such that the third specific features of sample objects generated by the ODM 204 focus on the outlines of the sample objects but omit the local details of the sample objects.

Figure 4C:
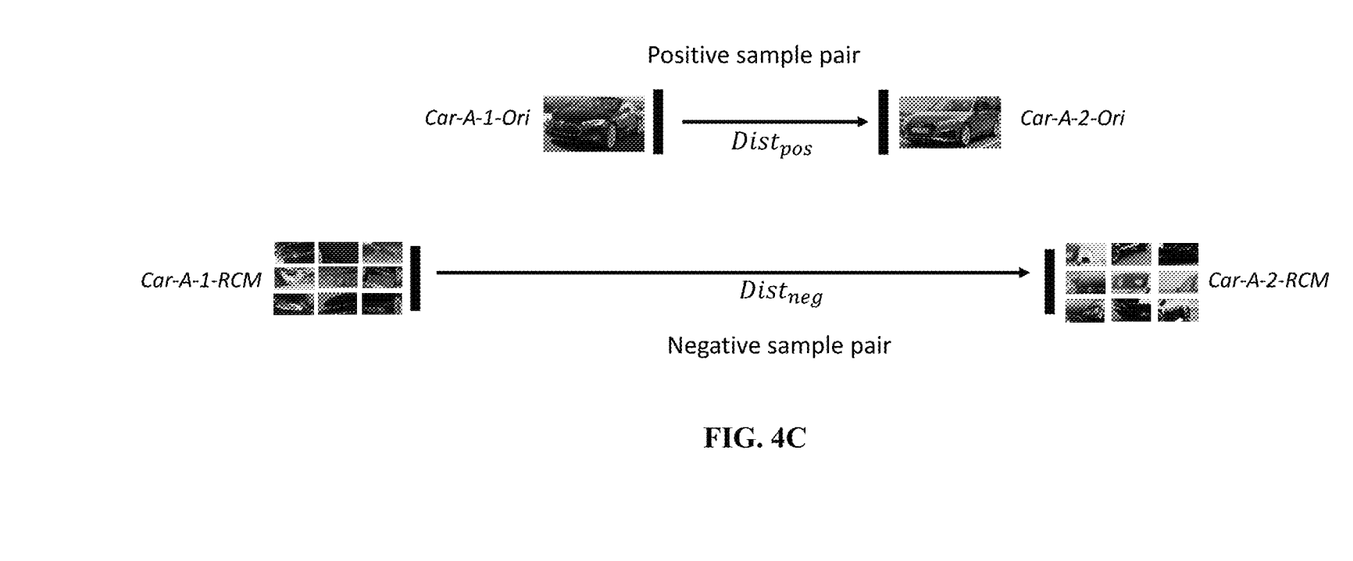
FIG. 4C depicts an illustration of a pairwise-sample-based loss function of an outline description module in accordance with an embodiment of the present invention.

To illustrate with an example, referring to FIG. 4C. In this example, a third positive sample pair is constructed with original image Car-A-1-Ori and another original image Car-A-2-Ori in the same sub-category A; and a third negative sample pair is constructed with RCM image Car-A-1-RCM and another RCM image Car-B-1-Ori in the same sub-category A. The feature distance between the third positive sample pair is $Dist_{pos}$; and the feature distance between the third negative sample pair is $Dist_{neg}$.

The ODM 204 is expected to capture the outlines of objects and remove the connected features noise among blocks that is introduced by the RCM images. This module only focuses on the shapes of objects, but ignores the local part features of objects.

The functional units and modules of the apparatuses and methods in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for training an apparatus for multi-focus fine-grained (MFFG) image search and retrieval, wherein the apparatus comprises:
    a feature extraction network executed by at least one processor configured to extract one or more basic query features of a query object from a query image;
    a class learning module executed by at least one processor configured to generate one or more first specific query features from the basic features, wherein the first query specific features represent an overall appearance of the query object;
    a local description module executed by at least one processor configured to generate one or more second specific query features from the basic features, wherein the second query specific features represent local details of the query object;
    an image search engine executed by at least one processor configured to:
        combine the first specific query features and the second specific query features to form one or more image-query joint features;
        obtain one or more features of each of a plurality of gallery image objects belonging to a meta-category of the query object;
        determine a cosine distance between the image-query joint features and the features of each of the gallery image objects;
        sort the gallery image objects by the cosine distances from most similar to the query object to least similar to the query object, wherein the gallery image object having the shortest cosine distance between the image-query joint features and the features of the gallery image object being the most similar to the query object, and the gallery image object having the longest cosine distance between the image-query joint features and the features of the gallery image object being the least similar to the query object; and
        output N number of gallery images of the sorted gallery image objects that are most similar to the query object; and
    an outline description module executed by at least one processor configured to generate one or more third specific query features from the basic query features, wherein the third specific query features represent an outline of the query object;
    wherein the image search engine is further configured to combine the first specific query features, the second specific query features, and the third specific query features to form one or more image-query joint features of the query object;
    wherein the method for training the apparatus comprises:
        obtaining a training dataset comprising a plurality of original images each containing one of a plurality of sample objects belonging to one of a plurality of sub-categories belonging to a single meta-category;
        generating a Region Confusion Mechanism (RCM) image for each of the original images by an augmentation module, wherein the RCM image is generated by separating the corresponding original image into a plurality of blocks followed by randomly reshuffling positions of the blocks and one or more of vertical flipping and horizontal flipping of the blocks;
        extracting one or more sample features of the sample object from each of the original images and each of the RCM images by the feature extraction network;
        iteratively training the class learning module, the local description module, and the outline description module with the sample features until classification models of all of the modules converge, comprising:
            minimizing a first pair-wise loss of the class learning module;
            minimizing a second pair-wise loss of the local description module; and
            minimizing a third pair-wise loss of the outline description module.

2. The method for training of claim 1,
    wherein the minimizing of the first pair-wise loss of the class learning module comprises:
        constructing a first positive sample pair with a first anchor original image as one of the original images containing a sample object belonging to one of the sub-categories and another one of the original images containing a sample object belonging to the same sub-category;
        constructing a first negative sample pair with the first anchor original image and another one of the original images containing a sample object belonging to a sub-category different from the sub-category of the sample object in the first anchor original image;
        minimizing an average feature distance of all first positive sample pairs among the all first positive sample pairs with the original images and maximizing an average feature distance of all first negative sample pair among the all first negative sample pairs with the original images; and
        updating the class learning module neural network;
    wherein the minimizing of the second pair-wise loss of the local description module comprises:
        constructing a second positive sample pair with a second anchor RCM image as one of the RCM images containing a sample object belonging to one of the sub-categories and another one of the RCM images containing a sample object belonging to the same sub-category;

constructing a second negative sample pair with a second anchor original image as one of the original images that is corresponding to the second anchor RCM image and another one of the original images containing a sample object belonging to a sub-category different from the sub-category of the sample object in the second anchor original image;

minimizing an average feature distance of all second positive sample pairs among the all second positive sample pairs with the RCM images and maximizing an average feature distance of all second negative sample pair among the all second positive sample pairs with the original images; and updating the local description module neural network; and wherein the minimizing of the third pair-wise loss of the outline description module comprises:

constructing a third positive sample pair with a third anchor original image as one of the original images containing a sample object belonging to one of the sub-categories and another one of the original images containing a sample object belonging to the same sub-category;

constructing a third negative sample pair with a third anchor RCM image as one of the RCM images that is corresponding to the third anchor original image and another one of the RCM images containing a sample object belonging to the same sub-category as that of the sample object in the third anchor RCM image;

minimizing an average feature distance of all third positive sample pairs among the all third positive sample pairs with the original images and maximizing an average feature distance of all third negative sample pair among the all third negative sample pairs with the RCM images; and updating the outline description module neural network.

3. The method of claim 1, wherein the feature extraction network of the apparatus is implemented by a convolutional neural network (CNN) comprising one or more convolutional layers and one or more fully-connected layers;

wherein the class learning module of the apparatus is implemented by a CNN comprising one or more convolutional layers and one or more fully-connected layers, and a first pairwise-sample-based loss function; and wherein the local description module of the apparatus is implemented by a CNN comprising one or more convolutional layers and one or more fully-connected layers, and a second pairwise-sample-based loss function.

4. The method of claim 1, wherein the image search engine of the apparatus is further configured to combine the first specific query features and the second specific query features to form one or more image-query joint features by concatenating the first specific query features and the second specific query features.

5. The method of claim 1, wherein the image search engine of the apparatus is further configured to combine the first specific query features and the second specific query features to form one or more image-query joint features by summing the first specific query features and the second specific query features.

6. A method for training a visual content search and retrieval platform configured to perform visual content search and retrieval from an image database, wherein the visual content search and retrieval platform comprises an object detection model, a coarse-grained image classification model, and a selection of one or more fine-grained image classification models, and the visual content search and retrieval platform performs the visual content search and retrieval by:

receiving a query image containing one or more objects;

locating and extracting a query object among the objects in the query image by the object detection model executed by at least one processor;

classifying a meta-category of the query object by the coarse-grained image classification model executed by at least one processor;

selecting from the selection of fine-grained image classification models the fine-grained image classification model that is implemented by an apparatus and trained using training data comprising images containing sample objects belonging to the meta-category of the query object, wherein the apparatus is for multi-focus fine-grained (MFFG) image search and retrieval and comprises:

a feature extraction network executed by at least one processor configured to extract one or more basic query features of a query object from a query image;

a class learning module executed by at least one processor configured to generate one or more first specific query features from the basic features, wherein the first query specific features represent an overall appearance of the query object;

a local description module executed by at least one processor configured to generate one or more second specific query features from the basic features, wherein the second query specific features represent local details of the query object; and an image search engine executed by at least one processor configured to:

combine the first specific query features and the second specific query features to form one or more image-query joint features;

obtain one or more features of each of a plurality of gallery image objects belonging to a meta-category of the query object;

determine a cosine distance between the image-query joint features and the features of each of the gallery image objects;

sort the gallery image objects by the cosine distances from most similar to the query object to least similar to the query object, wherein the gallery image object having the shortest cosine distance between the image-query joint features and the features of the gallery image object being the most similar to the query object, and the gallery image object having the longest cosine distance between the image-query joint features and the features of the gallery image object being the least similar to the query object; and output N number of gallery images of the sorted gallery image objects that are most similar to the query object; and searching and retrieving from the image database a plurality of gallery images containing gallery image objects belonging to the meta-category of the query object by the selected fine-grained image classification model;

wherein the method for training the visual content search and retrieval platform comprises:

obtaining a training data comprising a plurality of original images each containing one of a plurality of sample objects belonging to one of a plurality of sub-categories belonging to one of a plurality of meta-categories;

semi-labelling the original images by a semi-automatic labelling module executed by at least one processor, the semi-labelling comprising estimating locations of the sample objects in the original images and placing bounding boxes around the estimated locations;

fine-tuning the bounding boxes for more accurately labelling the sample objects in the original images to produce fully annotated training data;

training the object detection model with the fully annotated training data until the object detection model converges, locates, and extracts the sample objects from the fully annotated training data;

training the coarse-grained image classification model with the extracted sample objects until the coarse-grained image classification model converges;

obtaining a selected training data comprising a plurality of original images each containing one of a plurality of sample objects belonging to a selected meta-category; and training the fine-grained image classification model with the selected training data until the fine-grained image classification model converges.

7. The method of claim 6, wherein the object detection model applies a real-time supervised-based object detection approach to extract objects from images from background noise in locating and extracting the query object among the objects in the query image; and wherein the coarse-grained image classification model is implemented by a convolutional neural networking (CNN) comprising:

one or more convolutional layers configured to extract one or more basic query features of the query object; and a decision module having one or more fully-connected layers configured to summarize the basic query features and make classification of the meta-category of the query object.

8. A method for training an apparatus for multi-focus fine-grained (MFFG) image retrieval, wherein the apparatus comprises:

a feature extraction network executed by at least one processor configured to extract one or more basic query features of a query object from a query image;

a class learning module executed by at least one processor configured to generate one or more first specific query features from the basic features, wherein the first query specific features represent an overall appearance of the query object;

an outline description module executed by at least one processor configured to generate one or more third specific query features from the basic features, wherein the third query specific features represent an outline of the query object; and an image search engine executed by at least one processor configured to:

combine the first specific query features and the third specific query features to form one or more image-query joint features;

obtain one or more features of each of a plurality of gallery image objects belonging to a meta-category of the query object;

determine a cosine distance between the image-query joint features and the features of each of the gallery image objects;

sort the gallery image objects by the cosine distances from most similar to the query object to least similar to the query object, wherein the gallery image object having the shortest cosine distance between the image-query joint features and the features of the gallery image object being the most similar to the query object, and the gallery image object having the longest cosine distance between the image-query joint features and the features of the gallery image object being the least similar to the query object; and output N number of gallery images of the sorted gallery image objects that are most similar to the query object;

wherein the method for training the apparatus comprises:

obtaining a training dataset comprising a plurality of original images each containing one of a plurality of sample objects belonging to one of a plurality of sub-categories belonging to a single meta-category;

generating a Region Confusion Mechanism (RCM) image for each of the original images by an augmentation module, wherein the RCM image is generated by separating the corresponding original image into a plurality of blocks followed by randomly reshuffling positions of the blocks and one or more of vertical flipping and horizontal flipping of the blocks;

extracting one or more sample features of the sample object from each of the original images and each of the RCM images by the feature extraction network;

iteratively training the class learning module and the outline description module with the sample features until classification models of all of the modules converge, comprising:

minimizing a first pair-wise loss of the class learning module; and minimizing a third pair-wise loss of the outline description module.

\* \* \* \* \*